US006101433A

United States Patent [19]

Flicker, Jr.

[11] Patent Number: 6,101,433

[45] Date of Patent: Aug. 8, 2000

[54] AUTOMATED VEHICLE PREVENTATIVE MAINTENANCE SYSTEM

[75] Inventor: Ronald F. Flicker, Jr., Long Beach, Calif.

[73] Assignee: Challenger Enterprises, LLC, Orange, Calif.

[21] Appl. No.: 09/206,587

[22] Filed: Dec. 7, 1998

[51] Int. Cl.[7] ................................ G06F 7/00; G11B 5/00

[52] U.S. Cl. ................................ 701/35; 701/22; 701/29; 307/9.1; 360/5

[58] Field of Search ................................ 701/35, 22, 29, 701/30, 32; 340/425.5, 428, 457.4; 360/5; 307/9.1, 10.7

[56] References Cited

U.S. PATENT DOCUMENTS

| | | | |
|---|---|---|---|
| 4,031,363 | 6/1977 | Freeman et al. | 235/150.2 |
| 4,067,061 | 1/1978 | Juhasz | 364/900 |
| 4,478,521 | 10/1984 | Evans et al. | 368/8 |
| 4,525,782 | 6/1985 | Wohlfarth et al. | 364/431.01 |
| 4,542,461 | 9/1985 | Eldridge et al. | 364/424 |
| 4,612,623 | 9/1986 | Bazarnik | 364/669 |
| 4,949,263 | 8/1990 | Jurca | 701/35 |
| 4,989,261 | 1/1991 | Lee | 455/127 |
| 5,058,044 | 10/1991 | Stewart et al. | 364/551.01 |
| 5,250,761 | 10/1993 | Koyanagi | 702/177 |
| 5,289,369 | 2/1994 | Hirshberg | 364/401 |
| 5,289,378 | 2/1994 | Miller et al. | 701/35 |
| 5,303,163 | 4/1994 | Ebaugh et al. | 364/550 |
| 5,450,321 | 9/1995 | Crane | 701/35 |
| 5,550,738 | 8/1996 | Bailey et al. | 701/35 |

OTHER PUBLICATIONS

Article entitled "The ChangingScene of Mobile Equipment Maintenance"; Material Handling Engineering; Sep., 1997; Cover and pp. 5 and 57–63.

Promotional Brochure "LaserLite & DuraTrax", Videx, Inc. date unknown.

Catalogue, Data Collection Systems, Videx, Inc., pp. 3, 4, and 13–18 no month/date.

Catalog Pages from Dallas Semiconductor Catalog "DS1992/DS1993/DS1994", pp. 117–136, Copyright 1995.

Book of DS19xx iButton Standards, Dallas Semiconductor, pp. 2–9, Jun., 1995.

Electrical Wiring Diagram DIA–10–068 for Crown Power Steering Truck, Aug. 1992.

Electrical Diagram for Crown Electrical Power Worker, DIA–06.5–714, Apr. 1992.

Circuit Diagram for Clark ESR 500 S30, Power Steering Circuit for Electrical Sitdown Forklift, IN–18657, 1978 no month.

*Primary Examiner*—William A. Cuchlinski, Jr.
*Assistant Examiner*—Yonel Beaulieu
*Attorney, Agent, or Firm*—Charles H. Thomas

[57] ABSTRACT

Actual time of operation of a plurality of motorized vehicles is automatically recorded utilizing an operation logging circuit installed in each of the vehicles. Each operation logging circuit in each vehicle includes a memory button located in a protected enclosure and programmed with a unique vehicle identification code. Each memory button also has an electronic register for accumulating aggregate vehicle operation time. The memory button is electrically connected to the vehicle direct current electrical system for detecting actuation and deactuation of vehicle operation. For example, the connections to the memory button may be from the contacts for enabling the power steering, contacts for engaging the vehicle for forward and reverse movement, or contacts for the key switch for providing electrical power to the vehicle. A voltage regulating system steps down the power from the vehicle to the level of 5 volts which is required for operating integrated circuits. Each vehicle is provided with an extension circuit that leads to an interrogation port on the exterior of the vehicle and which is accessible from outside the body of the vehicle. A touch memory button reader is brought into physical contact with the interrogation port to interrogate each memory button of each vehicle to copy the vehicle identification number, time and date of interrogations, and the contents of an electronic register indicating accumulated hours of operation of each vehicle. The data copied into the touch memory button reader is downloaded into a central computer system for maintaining maintenance records.

15 Claims, 7 Drawing Sheets

AUTOMATED VEHICLE PREVENTATIVE MAINTENANCE SYSTEM

BACKGROUND OF THE INVENTION

1. Field of the Invention

The present invention relates to a system for automatically recording the time of operation of each vehicle in a fleet of motorized vehicles, automatically and electronically extracting the recorded aggregate time of operation along with a unique vehicle identification number and time and date of extraction, and automatically and electronically transferring that information into a computerized vehicle maintenance record.

2. Description of the Prior Art

In many commercial and industrial enterprises fleets of vehicles are often employed to perform various tasks. Different businesses often utilize a number of different vehicles within a fleet which are operated by different operators. As a consequence, no single operator is adequately familiar with the extent of operation of any particular vehicle to be in a position to call attention to the need for preventative maintenance. Furthermore, many operators of vehicles within a fleet are not qualified or knowledgeable concerning preventative maintenance requirements.

Nevertheless, preventative maintenance is extremely important for maintaining vehicles within a fleet in good operating condition by avoiding costly breakdowns. When a vehicle is forced out of service suddenly due to a breakdown, there is typically a considerable disruption to the business at hand. By performing routine preventative maintenance, however, costly repairs and disruptive delays due to the unavailability of vehicles within a fleet can be avoided. The need for preventative maintenance is largely dependent upon the extent to which a vehicle has actually been in operation since the last time preventative maintenance routines were performed on it.

One case in point illustrative of the benefits of preventative maintenance is in a situation where a fleet of forklift vehicles are utilized in warehouse operation. Forklifts are typically operated by different operators for differing periods of time. Keeping track of the extent to which each forklift has been operated since the most recent performance of preventative maintenance routines is a problem.

According to present practice a forklift is provided with an hour meter that is actuated by either the vehicle ignition switch or engagement of the power steering. In order to organize a preventative maintenance schedule, paper records are manually kept recording the time of operation of the hour meter of the vehicle. On a regular basis, for example weekly, the hour meter is read and its readings are recorded on paper along with the vehicle identification. The information kept on paper records concerning operation of the vehicle is then provided as a manual input to a data processing system, which uses this information to schedule vehicle servicing. A conventional computerized program establishes a schedule for certain preventative maintenance tasks to be performed, depending upon the recorded hours of operation since the last such task was performed on each specific vehicle.

The principal problem with manual record keeping concerning the operation of specific vehicles within a motorized fleet of vehicles is that systems based upon manually compiled records are quite unreliable. Mistakes are often made in the initial manual recordation of information read from hour meters and other instruments. Further mistakes are also made in transcribing these records from paper and inputting them as data into a computer system. Figures are often illegible or written in the wrong place. Also, because a manual compilation system is quite time consuming, information derived for some vehicles is often incomplete or not even recorded at all. Consequently, the practice of manually taking visual readings from meters in a vehicle, writing these records on paper, and transcribing the paper records as inputs to a computer keyboard have proven quite unsatisfactory.

Attempts have been made to automate the record keeping of data necessary to administer an adequate vehicle preventative maintenance program. For example, in some systems an onboard computer in the vehicle calculates and logs information from various sensors on the vehicle and provides this information to a combination card reader and writer. The card reader provides printed cards as an output which are then taken to a central computer for compilation of management ledgers and the display of data for the various vehicles in the fleet. However, such a system is extremely expensive, since each vehicle must be provided with an onboard computer and card reader and writer.

Other systems have been devised that accumulate data concerning operation of the vehicle onboard the vehicle and transmit that data using radio frequency or infrared data transmission. However, such systems are also inordinately expensive. Furthermore, they very frequently are subject to radio frequency or optical interference that corrupts the data being transferred.

SUMMARY OF THE INVENTION

The present invention involves a simple, economical, and expedient system for acquiring a record of accumulated time of operation of vehicles separately within a fleet of vehicles and transferring that information, along with a code uniquely associated with each vehicle, to a central data processing system that maintains the vehicle maintenance records and schedules preventative maintenance routines. A key aspect of the successful implementation of the present invention is the use of a touch sensitive memory button located onboard each vehicle in the fleet.

A memory button is a small, electronic, nonvolatile memory chip that is housed in a noncorrosive metal container, usually of disk-shaped configuration. Suitable memory buttons are commercially available for use in other applications. A memory button has an electronic contact surface which provides a path for the transmission of data.

Another important component of the invention is a touch memory button reader. A touch memory button reader is a data collection probe that has both a read and a write capability and an internal memory that allows storage of data from a large number of memory buttons which are eventually downloaded to a computer. A touch memory button reader has a data transfer contact surface which is operative to interrogate each memory button by physical contact with the electronic contact surface thereof.

A further important component of the apparatus of the invention is a central computer for maintaining maintenance records for all of the motorized vehicles in a fleet of vehicles. The computer may be a conventional Mackintosh or PC type computer programmed to manipulate, store, and calculate data useful to maintenance personnel so as to schedule maintenance routines for vehicles in the fleet. The central computer is provided with a downloading station that provides the communication link between a touch memory button reader inserted therein and the central computer. The downloading station is connected to the standard RS232 serial port of the central computer.

According to the system of the present invention, each vehicle in a fleet of vehicles is provided with a small box containing a printed circuit board upon which a memory button is mounted with its associated electronic circuitry. The box with its contents fits under the dash of the vehicle. The memory button is programmed by means of an EPROM with its own unique serial number, which the central computer is able to correlate with the model number and serial number of the vehicle in which the memory button is installed. The memory button of the invention automatically keeps track of the time of operation of each vehicle, and provides this information automatically to the data collection probe, along with the current time, date, and vehicle identification information, when the data collection probe is inserted into the data transfer port of the vehicle.

According to the invention a voltage signal tap is provided from some electrically operated system on the vehicle that is normally only actuated when the vehicle is actually in operation. In preferred embodiments according to the invention, electrical contacts that are associated with engagement of the power steering system or with propulsion of the vehicle are used as the sources of information concerning the duration of time of vehicle operation.

While the clock-enabling signal that controls the timer in the memory button indicative of the operation of the vehicle is preferably derived from the power steering or propulsion engagement contacts, information concerning time of operation of the vehicle may be derived from other electrical contacts as well. For example, in a propane or gas-driven vehicle signals from operation of the electrical distributor, alternator, or tachometer may be utilized as gating signals to the counter circuitry. Also, a signal from operation of the electrical ignition switch may likewise be employed, although this arrangement is less desirable since a vehicle may not actually be operating even though the electrical ignition is left in an actuated state.

Whichever electrical contacts are selected, the voltage signal from these contacts must be stepped down to between three and six volts. This signal is then provided as an input to the data collection chip or memory button located in the box on board the vehicle.

The memory button chip has a counter within that can be programmed, according to the invention, to accumulate signal counts during the time that, for example, the power steering is actuated. This triggering signal is stepped down from the actual voltage applied to the power steering. Once the power steering contacts open, the count accumulated in a counter on the printed circuit board represents an encoded tabulation of the aggregate duration of time during which the vehicle was in actual operation.

In order to provide a system for automatically collecting information for preventative maintenance, a data collection probe is provided to periodically extract information from the memory button. The person extracting information from the vehicles takes the touch memory button reader, which is a data collection probe, from one vehicle to the next. The person collecting data from the vehicles touches the data collection probe onto an extension circuit contact that is accessible from the exterior of the vehicle body and which is connected by an electrical extension circuit to the memory button chip. Data collection is preferably achieved by inserting the data collection probe into an electronic port formed as a well or socket in the protective shell of the vehicle body to collect identifying indicia and the information concerning time and date of data collection and hours of operation contained in the memory chip. The electronic port is connected to the memory button by an extension circuit.

When the data collection probe is touched onto the extension contact in the port for the printed circuit board located on the vehicle, transfer of the vehicle identifying information is accompanied by a transfer of the then current time and date and the accumulated count within the timer, measured in terms of hours and minutes. All of the information concerning the vehicle is electronically transmitted in encoded form to the data collection probe. Thus, the vehicle maintenance department need no longer keep track of time of operation using manually compiled paper records. Rather, this information is accumulated automatically within the printed circuit board that is queried from time to time using the data collection probe.

After having made the rounds of all of the vehicles, the person charged with collecting the vehicle operation data takes the data collection probe to a computer system. The information temporarily electronically stored in the data collection probe concerning the hours of operation of each vehicle is then loaded into the computer system in association with the vehicle identifying indicia.

The invention thereby provides a system that automatically accumulates a count indicative of actual time of operation of a vehicle without having to rely on the manual recordation of the operating hours of a vehicle by the vehicle maintenance department. Time is saved since there is no longer a need to keep hand written records in this regard. Moreover, the results are far more accurate since the information concerning vehicle operation is automatically accumulated and is provided each time the memory button in the vehicle is interrogated. Records will not vary depending upon the reliability of recordation by a person reading an hour meter.

A further aspect of the invention involves the recordation of scheduled preventative maintenance actually performed back into the computer system. Once a maintenance technician has completed a preventative maintenance task, or a remedial task correcting any problem in the vehicle, information concerning the work performed is fed back into the computer system using a touch sensitive screen or a keyboard. A program stored in the computer provides a format by which specified information is entered by touching appropriate locations on the screen. The technician is thereby able to input information into the computer concerning the task that was performed, the time involved in performing the task, the identification of parts utilized in performance of the task, and possibly other information as well. This information is tabulated in the computer to produce a running maintenance record for each vehicle that tabulates not only its status insofar as preventative maintenance and repair work is concerned, but also a record of the cost of maintaining and operating the vehicle.

One important application of the invention is to the maintenance of forklifts within a warehouse. However, the same principles of monitoring actual operation of a motor or engine can be employed in a similar manner in connection with other types of land surface vehicles as well as boats or aircraft. The invention may also be applied to machines other than vehicles on which maintenance tasks must be performed on a scheduled basis after predetermined periods of operation, such as industrial machining tools, elevators, escalators, and innumerable other electronically controlled devices.

In one broad aspect the invention maybe considered to be a combination of elements. This combination is comprised of: a motorized vehicle, a memory button, voltage regulation circuitry, an extension circuit, a touch memory button reader, and a central computer system.

The motorized vehicle has a vehicle operating direct current electrical system for actuating and deactuating vehicle operation. The vehicle also has a vehicle body that includes an outer shell which shields a protected enclosure therewithin.

The memory button has an electronic contact surface disposed within the protected enclosure in the vehicle. The memory button is programmed with a unique vehicle identification number. The memory button includes an actuatable and deactuatable timer and an electronic storage register for accumulating aggregate time of operation of the timer.

The voltage regulation circuitry is connected between the vehicle operating electrical system and the memory button. The voltage regulating circuitry steps down voltage from the vehicle direct current electrical operating system, preferably to a level of about five volts, to provide an electrical input to the memory button during vehicle operation.

The extension circuit is connected to the electronic contact surface of the memory button and includes an extension contact which is secured relative to the outer shell of the vehicle. The extension contact surface may be formed as a small plate that is accessible for physical contact from outside the shell.

The touch memory button reader has a data transfer contact. The touch memory reader copies the vehicle identification number and the aggregate time of operation of the timer from the memory button when the data transfer contact of the memory button reader touches the extension contact of the extension circuit.

The central computer system is programmed to store and manipulate vehicle maintenance data concerning the motorized vehicle. The central computer system includes a touch sensor that extracts the copied vehicle identification number and the copied aggregate time of operation from the touch memory button reader when the data transfer contact of the touch memory button reader physically touches the touch sensor.

In another broad aspect the invention may be considered to be an apparatus for automatically recording actual time of operation of a plurality of motor vehicles. Each of the motor vehicles has a vehicle operating direct current electrical system for actuating and deactuating vehicle operation. Each vehicle has a vehicle body that includes an outer shell that shields a protected enclosure therewithin.

The apparatus is comprised of an automated vehicle operation logging circuit installed in each of the vehicles. Each of the automated vehicle operation logging circuits includes a memory button having an electronic contact surface disposed within the protected enclosure within the vehicle body. Each memory button is programmed with a unique vehicle identification code and includes an electronic timer and an electronic register for ascertaining current time and date and for accumulating aggregate vehicle operation time provided by the timer.

The apparatus of the invention also includes a voltage regulating circuit connected from the vehicle operating direct current electrical system for actuating and deactuating vehicle operation to provide a stepped down direct current data signal to the memory button during vehicle operation. An extension contact is secured relative to the vehicle shell and is accessible from the exterior of the shell. An electrical extension line is connected between the extension contact and the electronic contact surface of the memory button.

The invention further includes a touch memory button reader that has a data transfer contact and is operative to interrogate each memory button and copy each vehicle identification number and the contents of each electronic register in association therewith. This occurs when the data transfer contact is selectively placed into physical contact with each extension contact of each automated operation logging circuit.

The apparatus also includes a central computer for maintaining maintenance records for all of the plurality of motorized vehicles. The central computer has a touch sensor that automatically downloads the copied vehicle identification numbers and the copied contents of the electronic registers of all of the vehicles. This takes place when the data transfer contact of the touch memory button reader is placed in contact with the touch sensor of the central computer.

In still another broad aspect, the invention may be considered to be a method of recording the accumulated time of operation of a motorized vehicle having a vehicle operating direct current electrical system for actuating and deactuating vehicle operation and a vehicle body that includes an outer shell that shields a protected enclosure therewithin. The method is comprised of providing within the protected enclosure a memory button having an electronic contact surface, an actuatable and deactuatable timer and an electronic storage register for accumulating aggregate time of operation of the timer. According to the invention a voltage regulation circuit is provided to step down direct current voltage from the vehicle operating electrical system to the memory button. An extension circuit is provided from the electronic contact surface of the memory button to an extension contact accessible for physical contact from outside the vehicle shell.

According to the practice of the method, a unique vehicle identification code is electronically stored in the memory button. Thereafter, the extension contact is periodically touched with a touch memory button reader to copy into the reader from the memory button the unique vehicle identification code and aggregate time of operation of the timer in association therewith. The copied identification code and the copied aggregate time of operation is downloaded from the touch memory button reader into a central computer system programmed to store and manipulate vehicle maintenance data concerning the motorized vehicle.

The invention may be described with greater clarity and particularity by reference to the accompanying drawings.

DESCRIPTION OF THE EMBODIMENT AND IMPLEMENTATION OF THE METHOD

Figure 1:
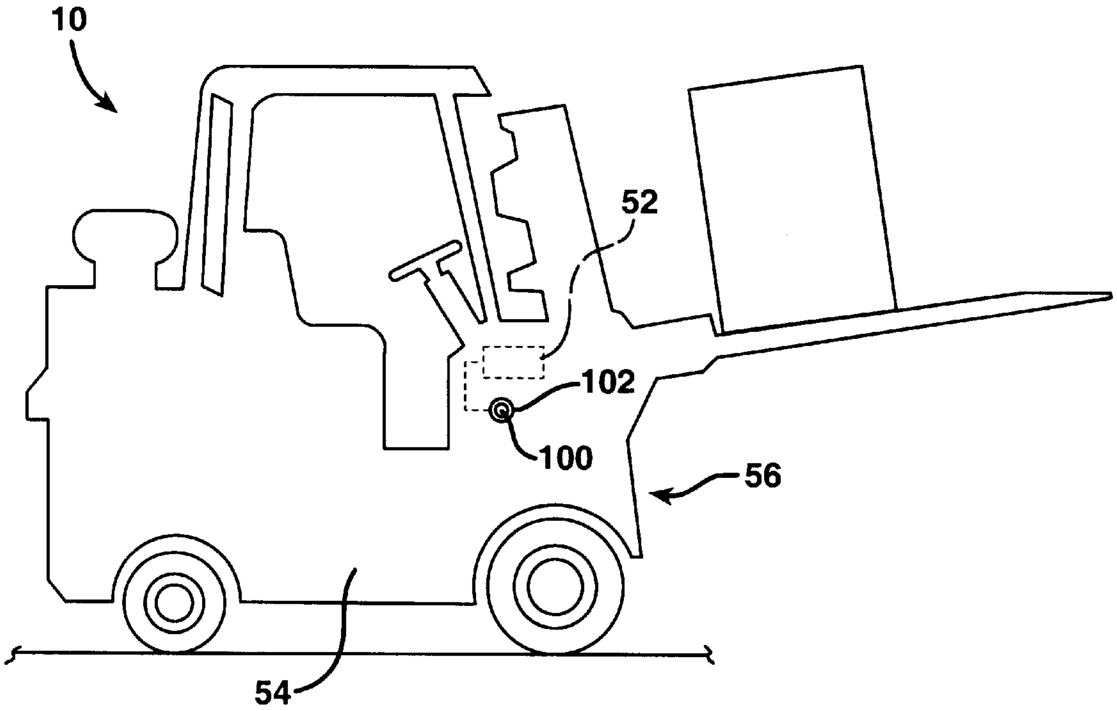
FIG. 1 is a diagrammatic view of a motorized forklift vehicle in which a vehicle operation logging circuit is installed.

FIG. 1 illustrates generally and diagrammatically a motorized vehicle which is a sit down, forklift truck 10. The forklift truck 10 has a conventional, vehicle operating, direct current electrical system for actuating and deactuating vehicle operation. This system is indicated generally at 12 in FIG. 3. The electrical system 12 may be considered to encompass the controls for all of the electrically controlled mechanisms on the vehicle. However, the operation logging circuit of the invention is connected through selected contact terminations in a termination block indicated at TB-1 in the vehicle contactor panel 14 of the vehicle 10, which is shown diagrammatically in FIG. 3.

Figure 2:
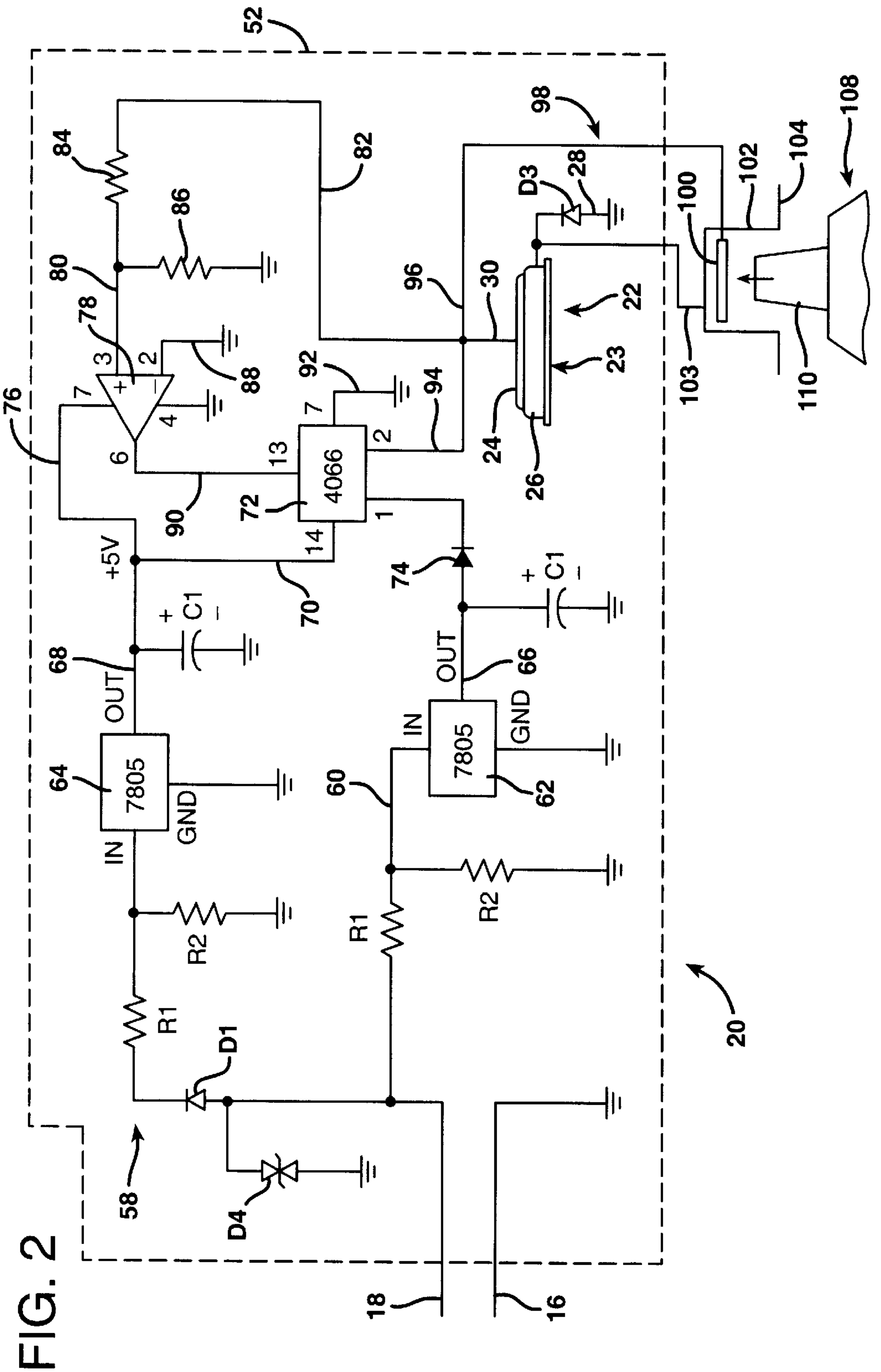
FIG. 2 is a schematic diagram of the vehicle operation logging circuit installed in the vehicle of FIG. 1.
Figure 3:
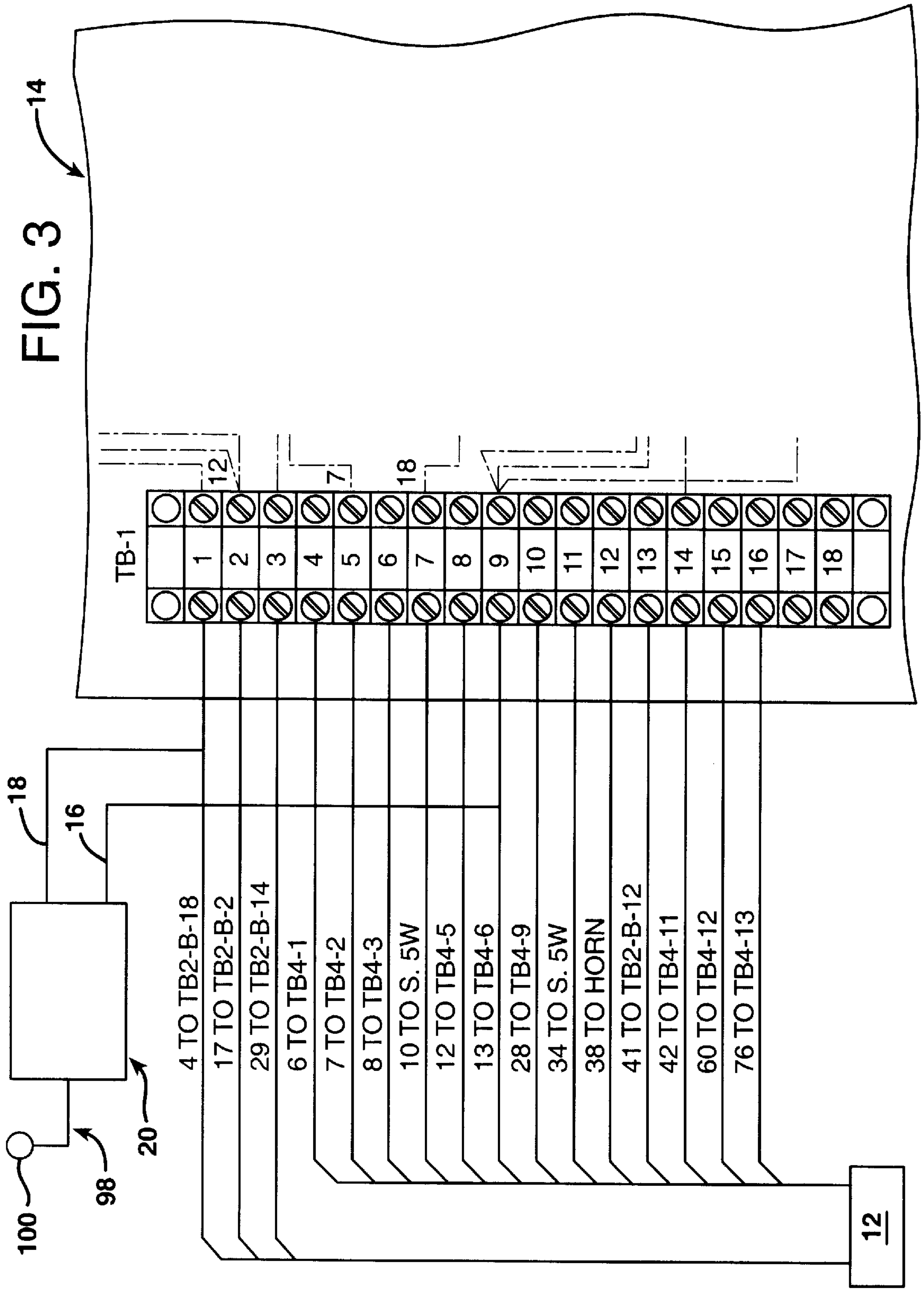
FIG. 3 is a schematic diagram show the interconnection of the operation logging circuit of FIG. 2, to the vehicle propulsion engaging circuit through the contactor panel of an electric, sit down forklift vehicle.

The operation logging circuit of the invention is indicated generally at 20 in FIG. 2. and is depicted merely in block diagram form in FIG. 3. The operation logging circuit 20 is connected to selected terminations of the termination block TB-1 so that signals indicating operation of the vehicle are supplied to the operation logging circuit 20 only when a selected operating component of the vehicle operating electrical system 12 is enabled. In one preferred embodiment, and in the connection arrangement illustrated in FIG. 3, signals are only supplied on lines 16 and 18 to the operation logging circuit 20 when the forward or reverse directional contacts for the propulsion system of the vehicle 10 are enabled.

The vehicle operating electrical system 12 in the contactor panel 14 depicted in FIG. 3 is for a Clark ESC (Electrical Sit-Down Counterbalance) forklift truck, Model No. 500 S30. The signal lines 16 and 18 that provide signals to the automated operation logging circuit 20, are connected to terminations 9 and 1 respectively, in the termination block TB-1. Termination 9 is the vehicle negative ground termination of the direct current power supply for the vehicle 10. Termination 1 is a termination that goes positive when the forward or reverse directional contacts for the vehicle 10 go into gear.

Termination 1 is at a positive 12-volt DC power level when the directional contacts for the vehicle 10 are enabled. Therefore, termination 1 is at a positive 12-volt level relative to termination 9 whenever the vehicle propulsion system is actuated. This can only occur when the vehicle 10 is in gear. As a consequence, the positive 12-volt differential exists between the lines 18 and 16 only when the vehicle is actually operating. At all other times there is no voltage at terminal 1 and, therefore, there is no voltage differential between the lines 16 and 18 leading to the vehicle operation logging circuit 20.

Figure 4:
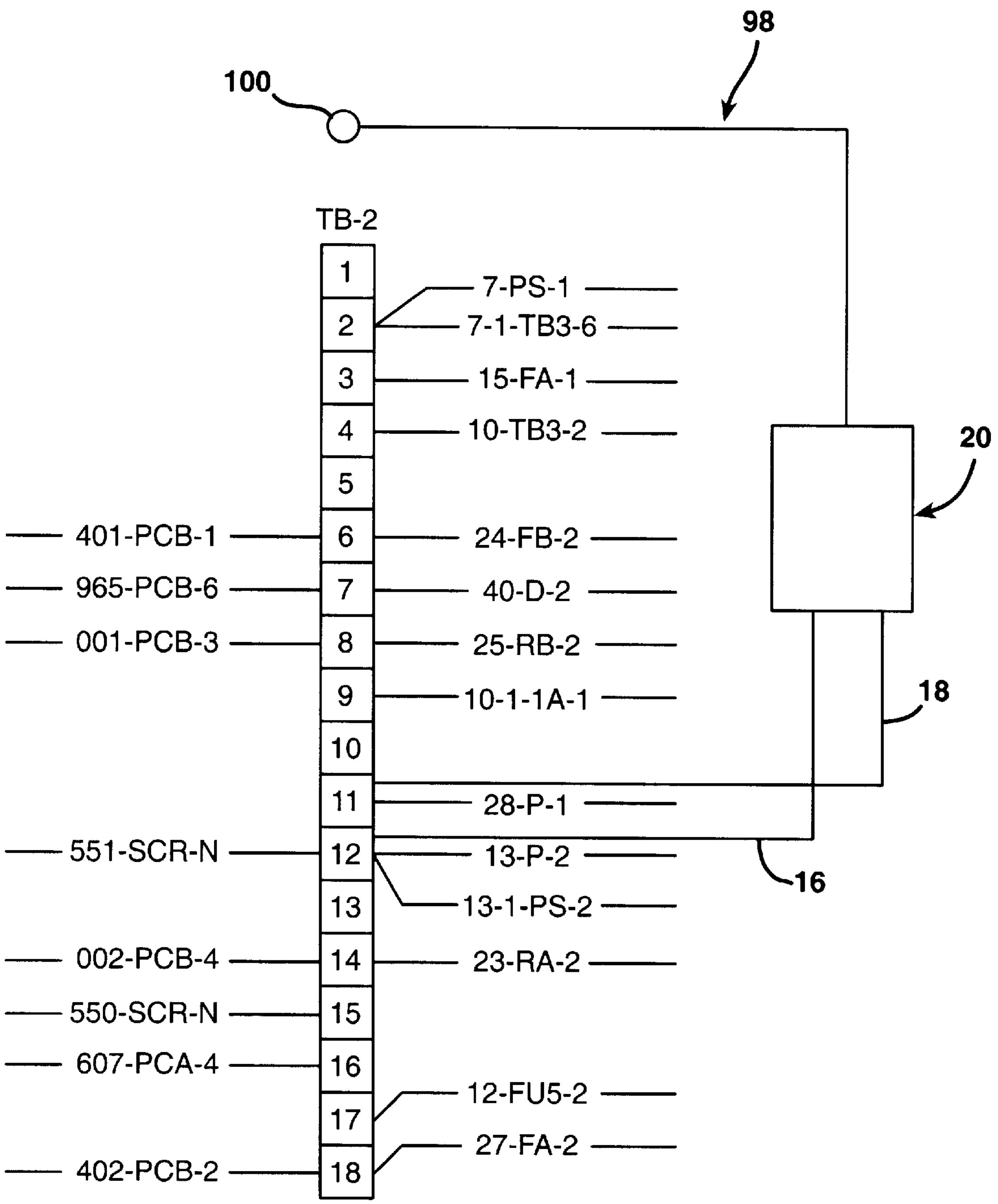
FIG. 4 is a electrical schematic diagram showing the connection of the operation logging circuit of FIG. 2 to the vehicle power steering of a different, standup forklift truck through the termination block thereof.

FIG. 4 illustrates an alternative connection of the signal lines 16 and 18 of the operation logging circuit 20 to a different model forklift. Specifically, in the embodiment of FIG. 4, the signal lines 16 and 18 are respectively connected to terminations 12 and 11 of terminal block TB2 in a Crown Model RC (Rider Counterbalance) forklift truck sold by Crown Lift Trucks located at 4061 Via Oro Avenue, Long Beach, Calif. 90810. In this arrangement also, termination 11 is at a positive 12-volt level relative to the vehicle negative, ground termination 12 when the power steering of the truck is operated. The voltage level on termination 11 drops to a zero level so that no voltage differential exists between terminations 11 and 12 when the truck power steering is deactuated.

In the preferred embodiments of the invention, signals are provided on lines 16 and 18 to the operation logging circuit 20 only when the vehicle 10 is actually operating. For this reason, the signal lines 16 and 18 are connected to terminal block locations at which a voltage differential exists only when the vehicle is actually under a load.

The power steering or vehicle propulsion directional contactor terminals are the preferred termination points for the signal lines 16 and 18 in an electrically operated forklift truck, since the vehicle propulsion system and the vehicle power steering are only actuated when the vehicle is being actively operated. Under such conditions the power steering and vehicle propulsion directional contactors remain in a deactuated condition except during times that the vehicle is being actively operated. Therefore, by connecting the operation logging circuit 20 to the power steering or directional contactors, a more accurate tabulation of active operating time is obtained. However, the system of the invention is not limited to utilization of these particular electrical system contacts.

Figure 5:
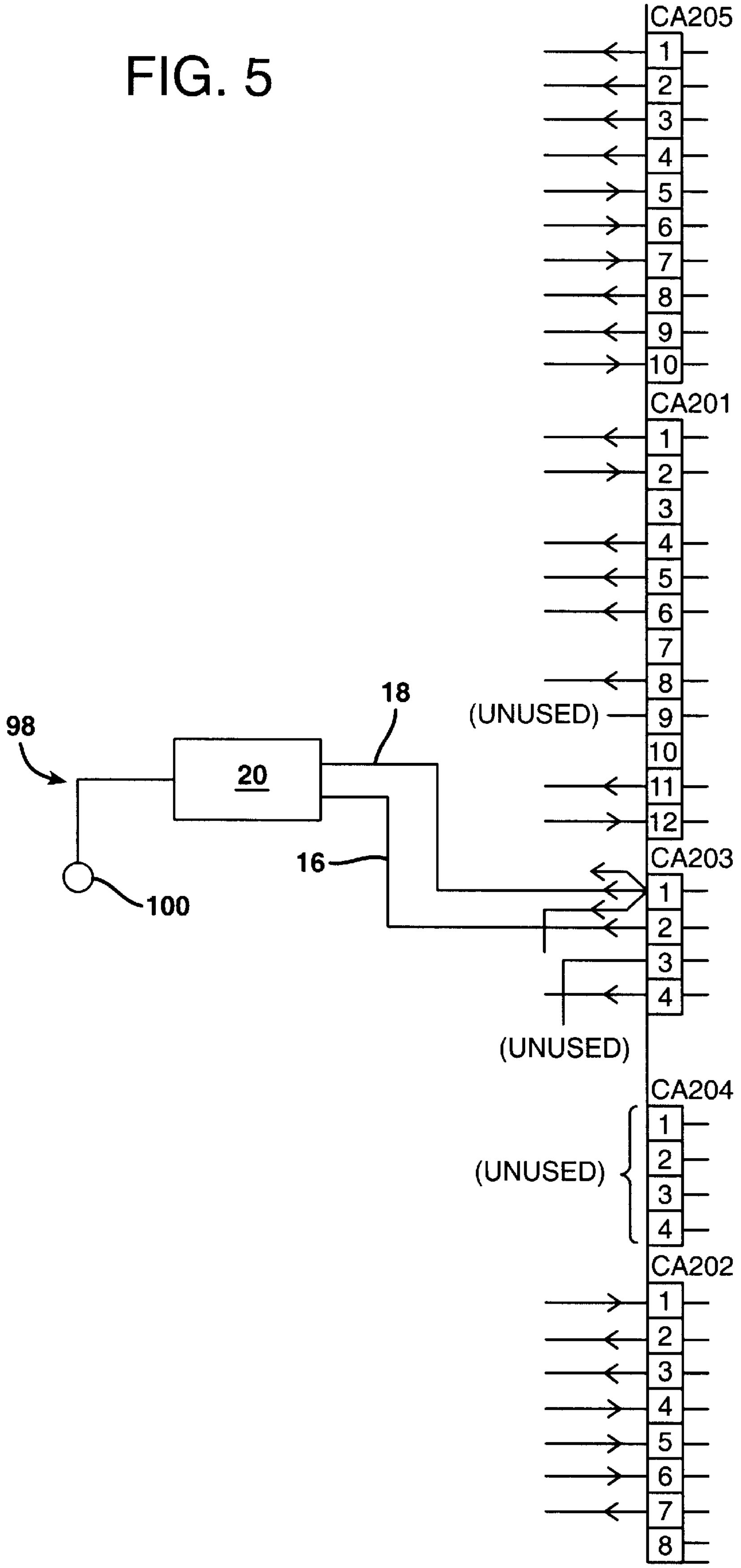
FIG. 5 is an electrical schematic diagram illustrating the connection of the operation logging circuit of FIG. 2 to the electrical power circuit for still another model of forklift truck.

FIG. 5 illustrates an alternative embodiment of the invention in which the signal lines 16 and 18 are connected to the terminal block locations in the distribution panel across which a voltage differential exists when the vehicle key switch is actuated. FIG. 5 illustrates the distribution panel terminations for a Crown Model PE (Pallet Endrider) forklift, also sold by Crown Lift Trucks. In this embodiment signal line 16 is connected to termination 2 of distribution panel termination group CA203 while signal line 18 is connected to termination 1 of that same termination group. When the key switch of the vehicle is turned to provide electrical power to the vehicle, terminal 1 of distribution panel termination group CA203 is at a positive level relative to termination 2 in that same termination group. When the key switch is turned off, there is no voltage differential between these two points. As a consequence, signal line 18 is at a positive voltage level relative to the signal line 16 during the time that the key switch is actuated in the vehicle of FIG. 5.

The electrical components of the operation logging circuit 20 are illustrated schematically in FIG. 2. As shown in that drawing figure, the memory button 22 is physically constructed with its electronic components housed within a very small, generally disk-shaped, stainless steel enclosure having a flat, circular electronic contact surface 24 electronically insulated from a peripheral, generally cylindrical surrounding edge surface 26. The surface 26 is connected to electrical ground through a 1N4001 diode D3 by line 28 as illustrated. The electrical contact surface, or data surface, 24 is connected to the remaining components of the operation logging circuit 20 by electrical line 30.

The memory button 22 is quite small in physical size. One suitable memory button which may be utilized as the memory button 22 is the model DS 1994, 4K bit Plus Time Touch Memory manufactured by Dallas Semiconductor, located at 4401 South Beltwood Parkway, Dallas, Tex. 75244-3292. This device has a maximum diameter of 17.35 millimeters and a maximum height of 5.89 millimeters.

Figure 6:
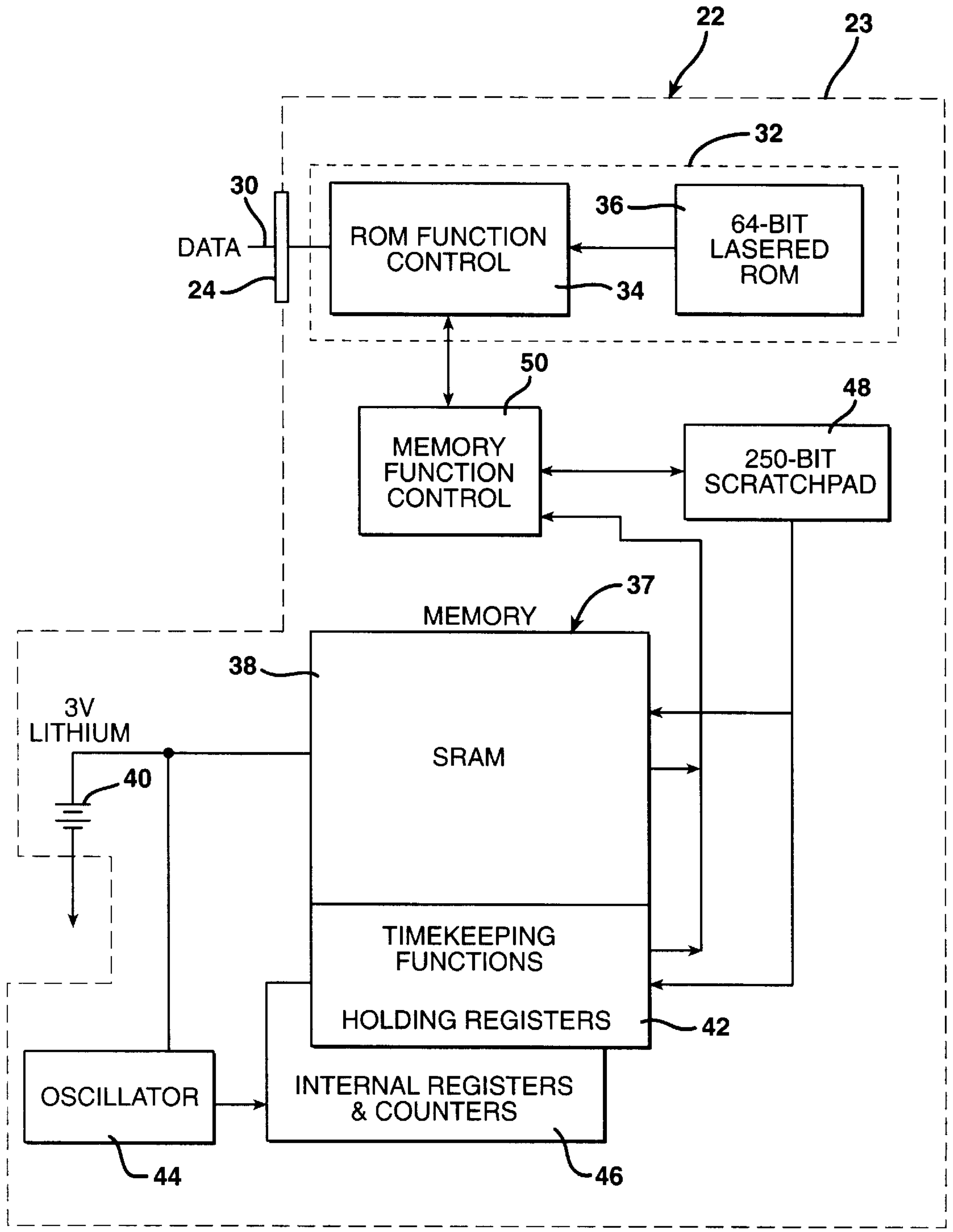
FIG. 6 is a diagram illustrating the internal organization of the memory button shown in FIG. 2.

FIG. 6 is a block diagram illustrating the logic sections of the memory button 22. As illustrated in that drawing figure, the electronic components of the memory button 22 are disposed within a protected enclosure indicated generally at 23. The enclosure 23 is a clam shell steel container that is suitable for use in industrial environments.

The electronic chip 37 housed within the stainless steel container 23 of the memory button 22 has 4096 bits of read/write nonvolatile memory 38, indicated in FIG. 6. The memory is partitioned into 256-bit pages for packetizing data. Data integrity is ensured with read/write protocols. The memory button 22 contains a real time clock calendar section 42 in a binary format that can automatically accumulate time when power is applied.

Operating power for the memory button 22 is provided by parasitic circuitry, indicated generally at 32, that includes a ROM function control 34 and a 64-bit lasered ROM 36. The energy needed for communication with the memory button 22 is extracted from the data line 30 that is connected to the electronic contact surface 24. The data input to the memory button 22 is also provided on the data line 30 that is soldered or otherwise held in direct, intimate physical contact with the electronic contact surface 24 of the memory button 22.

The nonvolatile memory chip 37 within the memory button 22 consumes only leakage current when in a idle state. The memory button 22 contains a three volt lithium battery 40 that is coupled to the nonvolatile memory chip 37. The memory chip 37 performs timekeeping functions in the section 42. A 32,768 Hz oscillator 44 is connected to the RAM memory section 38 of the memory chip 37 and to internal registers and counters indicated at 46. A 250-bit scratch pad 48 and a memory function control 50 are coupled between the memory section 38 and holding registers 42 and the ROM function control 34.

The memory button 22 is programmed with a unique, fixed digital identification number which becomes a unique vehicle identification number when the operation logging circuit 20 is installed in the vehicle 10. Specifically, the 64-bit lasered ROM 36 contains a unique ROM code that is 64-bits long. Forty-eight of these bits are a unique serial number that becomes a unique vehicle identification number once the memory button 22 is installed in the vehicle 10.

The crystal oscillator 44 is used as the time base for the timekeeping functions of the memory button 22. These timekeeping functions are performed in the actuatable and deactuatable time section 42 of the memory 38. Other locations within the memory 38 serve as an electronic storage register for accumulating aggregate time of operation of the timer section 42. Due to the connections of the signal lines 16 and 18, this same accumulated aggregate time represents the accumulated aggregated time of vehicle operation. The memory section 38 is programmed with the correct time and date, which is updated by the oscillator 44 and maintained current in the timekeeping and register section 42 of the memory chip 37.

The protective case 23 of the memory button 22 is specially sealed to withstand moisture, radiation, and temperature extremes. The memory button 22 is suitable for use in industrial applications where harsh environmental conditions exist. Nevertheless, the memory button 22 is not the only electrical component in the operation logging circuit 20. Consequently, it is highly advisable for the circuitry of the electronic logging circuit 20 to be housed within a protective box 52 that is located within the protective shell 54 of the body 56 of the forklift vehicle 10. The shell 54 may be a sheet metal or hard plastic structure that substantially envelopes the protective enclosure within which the operation logging circuit 20 is mounted. This enclosure is preferably the area beneath the dashboard of the vehicle body shell 54.

Within the protective metal or plastic case 52, the operation logging circuit 20 includes voltage regulating circuitry that is connected from the electrical system for actuating and deactuating vehicle operation to the memory button 22 through the signal lines 16 and 18 by means of an RJ11 plug connection into voltage regulating circuitry, which is indicated generally at 58 in FIG. 2. The voltage regulating circuitry 58 provides a stepped-down direct current data signal to the memory button 22 on data line 30 during operation of the vehicle 10.

Data signal line 18 from the vehicle 10 is connected to the inputs of a pair of 5-volt model 7805 voltage regulators 62 and 64 through resistors R1 and R2 as illustrated in FIG. 2. A transient voltage suppressor D4 is coupled between system ground and signal line 18. The transient voltage suppressor D4 is a model P6KE15CA 14.3-volt Zener diode, the cathode of which has been shorted out. The transient voltage suppressor D4 prevents any static electricity from damaging the other components of the voltage regulating circuitry 58. A model 1N4001 diode D1 is connected between the junction of the transient voltage suppressor D4 with line 18 and resistor R1.

Each of the voltage regulators 62 and 64 has a standby current of 5 milliamperes. The current draw remains at 5 milliamperes in operation because the voltage regulators 62 and 64 are only supplying a regulated output control voltage. There is a negligible current draw at the output lines 66 and 68 of the voltage regulators 62 and 64.

The output voltage of both of the voltage regulators 62 and 64 is at a positive 5-volt level. The voltage regulator outputs 66 and 68 are each connected to ground through capacitors C1 respectively associated therewith. These capacitors are each 1-microfarad/6-volt high quality tantalum capacitors that are connected between the outputs 66 and 68 and the ground terminals of the 7805 voltage regulators 62 and 64. The capacitors C1 should be connected as close as possible, that is with the shortest possible leads, to their respective voltage regulator outputs for best performance and protection against voltage spikes.

Different models of vehicles 10 employ different voltage systems. In industrial applications, voltages of the vehicle operating direct current electrical systems for actuating and deactuating vehicle operation are standardized alternatively at 12 volts, 24 volts, 36 volts, and 48 volts. Table 1 sets forth the values of the resistors R1 and R2 in ohms for the four different, standard vehicle operating voltages.

TABLE 1

| V | $R_1$ | $R_2$ |
|---|---|---|
| 12 V | 100 Ω | 510 Ω |
| 24 V | 619 Ω | 510 Ω |
| 36 V | 1100 Ω | 510 Ω |
| 48 V | 1620 Ω | 510 Ω |

The voltage output of the voltage regulator 64 is connected by lines 68 and 70 to pin 14 of a 4066 CMOS bilateral switch integrated circuit 72. The output line 66 from voltage regulator 62 is connected through a 1N4001 rectifying diode 74 to pin 1 of the 4066 switch 72.

The voltage regulators 62 and 64 serve to step down the 12, 24, 36, or 48 system voltage of the vehicle 10 to a constant, 5-volt, 5 milliampere level that is provided as an input to the memory button 22 on line 94 when signal line 18 from the vehicle 10 is at the vehicle system voltage level. An operational amplifier 78 and a switch 72 serve to automatically disconnect the vehicle voltage to memory button 22 when a negative voltage is applied to line 96, which is connected to line 30. This occurs when information stored in the memory button 22 is extracted therefrom.

The 5-volt output from voltage regulator 64 is connected from line 68 to line 76 as a biasing input to the model NTE 930 CMOS operational amplifier 78. The input line 80 at pin 3 of the operational amplifier 78 is connected to data input line 30 from a junction line 82 through a 5-megohm resistor 84. Data input line 30 is connected to the memory button 22. Line 80 is also connected to ground through a 100 Kohm resistor 86. The other input to operational amplifier 78 at pin 2 is connected to ground by line 88. The output on pin 6 of operational amplifier 78 is connected by line 90 to pin 13 of the 4066 CMOS bilateral switch 72. Pin 7 of the switch 72 is connected to ground by line 92.

Because the operating components of the operation logging circuit 20 are housed within an enclosed, protective box 52 beneath the vehicle dashboard, the memory button 22 is not directly accessible for interrogation. Therefore, it is necessary to provide an extension circuit indicated generally at 98 in FIG. 2. The extension circuit 98 includes the extension line 96 from the data line 30 which is connected to the electronic contact surface 24 of the memory button 22. The remote end of the extension line 96 is connected to a metallic, extension contact plate 100 that is accessible from the exterior of the vehicle body shell 54. The contact plate 100 serves as an electronic port that is located in a shallow well or socket receptacle 102 mounted to the vehicle body 54. The extension contact plate 100 is isolated from vehicle ground.

The purpose or providing the extension line 96 and extension contact plate 100 is to facilitate electrical access to the memory button 22 while still physically protecting the memory button 22, and the rest of the operation logging circuit 20 from both physical damage and contamination. To this end, the socket 102 may be mounted in the vehicle body shell 54 by merely drilling a small hole in the shell 54 and securing the flange 104 of the socket 102 to the area around the drilled hole using an adhesive, or by other fastening means, such as self-tapping screws. The socket 102 is coupled to edge surface 26 of the memory button 22 by line 103, as illustrated in FIG. 2.

Figure 7:
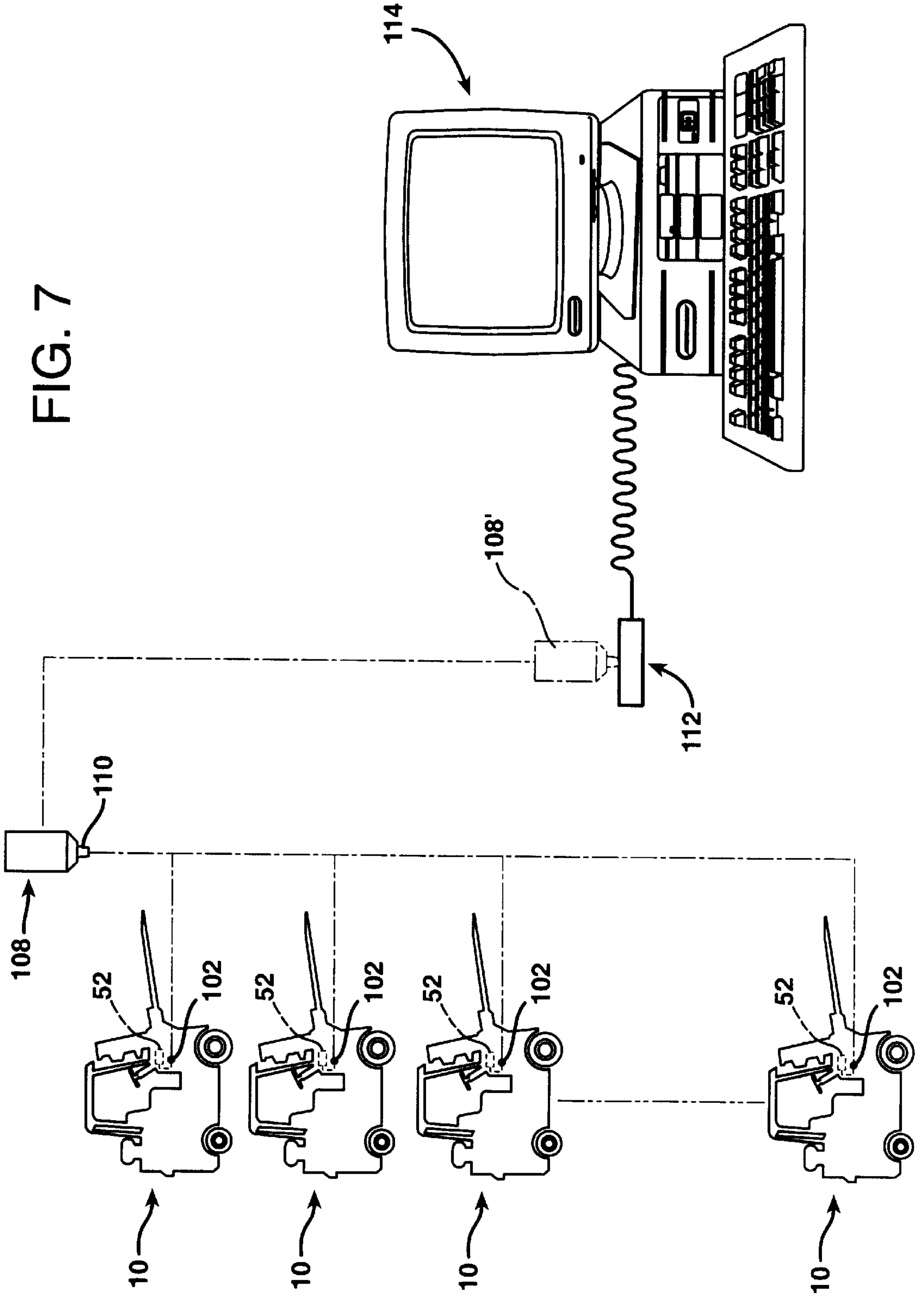
FIG. 7 is a diagram illustrating the operation of the system and implementation of the method of the invention.

As illustrated in FIG. 2, and as also illustrated in FIG. 7, the system of the invention also employs a touch memory button reader 108. The touch memory button reader 108 has a data transfer contact tip 110 and is operative to interrogate the memory button 22. In conventional use the end of the data transfer contact tip 110 is pressed against the electronic contact surface 24 of the memory button 22. However, in the system of the present invention the necessary physical connection required to interrogate the memory button 22 is through the extension contact plate 100.

The touch memory button reader 108 is a conventional device which is marketed, for example, as the TouchProbe reader by Videx, Inc., located at 1105 N.E. Circle Boulevard, Corvallis, Oreg. 97330. The touch memory button reader 108 is constructed of plastic and cast metal and has a water-resistant plastic case. It has physical dimensions of about 5.2 inches by 1.6 inches by 0.8 inches (132 by 41 by 20 millimeters). The touch memory button reader weighs between about 4.2 ounces and 5.8 ounces (119–165 grams). It has a 128 K RAM memory and an LED flash to indicate successful reading or writing. The touch memory button reader 108 is powered by a 9-volt alkine battery and also includes a backup lithium battery. It has a minimum scanning speed of 1/20th of a second and a capacity for reading 5000 memory buttons 22.

The data transfer contact tip 110 includes a central portion that establishes electrical contact with the extension contact plate 100 when the touch memory button reader tip 110 is inserted into the socket 102. It also has a peripheral portion which contacts the socket 102, that in turn is coupled to vehicle ground.

When the data transfer contact tip 110 is inserted into the socket 102 to establish contact with the extension contact plate 100, the touch memory button reader 108 is operative to interrogate the memory button 22 and copy the vehicle identification number, which is the serial number of the memory button 22, the then current time and date, and the aggregate time of operation of the timing circuitry within the memory button 22 that is stored in the memory chip 37. Each memory button reader 108 performs this copying or data extraction operation when the data transfer contact tip 110 touches the contact plate 100 of the extension circuit 98.

The touch memory button reader 108 is also used to write information into the memory buttons 22. To this end the user enters data into a MS Access form. Data is formatted for data file specifications of pages 0 through 15 of the nonvolatile memory 38. The reader 108 then uploads the revised data files into the memory buttons 22. The liquid crystal display (LCD) on the reader 108 shows the unit number of the next available data file for downloading. The user reads this display and downloads the revised data file into the memory button 22 of the appropriate vehicle 10 identified by the LCD display. Once writing of data has been completed, the reader 108 shows the next unit number file for uploading.

FIG. 7 illustrates diagrammatically a method according to the invention of recording the accumulated time of operation of a plurality of motorized vehicles 10. A user periodically touches the extension contact plate 100 in the extension socket 102 of each vehicle 10 with a touch memory button reader 108. The memory button reader 108 is sequentially moved from one vehicle 10 to the next, extracting the required data therefrom by insertion of the data transfer contact tip 110 into each socket 102.

When the data transfer contact tip 110 of the touch memory button reader 108 is inserted into the socket 102 to contact the extension contact plate 100, the touch memory reader 108 copies and temporarily stores certain data from the memory button 22. Specifically, it records the individual serial or identification number of the memory button 22 in the vehicle 10. This identification number is later correlated with a specific vehicle serial number and model number in the computer system 114. The touch memory button reader 108 also interrogates pages 0 through 15 of the DS1994 nonvolatile RAM memory 38, as well as the interval timer 42 thereof. This provides the aggregate time of operation of the timer. The memory button reader 108 also records the contents of the cycle counter of the DS1994 nonvolatile memory 38 and the date and time at which the information is copied from the memory button 22. The memory button reader 108 displays the unit number of the last unit read.

After the accumulated aggregate vehicle operation times, associated vehicle identification numbers and times and dates of data acquisition have been collected in the memory button reader 108, the touch memory button reader 108 is carried to and inserted into a downloading station 112, as indicated at 108'. The computer system 114 thereupon downloads the data from the touch memory button reader 108 through the downloader station 112.

To download data, the data transfer tip 110 of the touch memory button reader 108 is inserted into a socket in the downloading station 112. Data is extracted from the touch memory button reader 108 under the control of a conventional PC or Mackintosh computer 114. The downloading station 112 is also sold by Videx, Inc. as the TouchProbe Downloader Station. The downloading station 112 is connected to the standard serial RS-232 port of the central computer system 114.

The computer system 114 is programmed to store and manipulate vehicle maintenance data concerning each of the motorized vehicles 10. The downloading station 112 serves as a touch sensor for the computer system 114 that extracts the vehicle identification number, time and date of interrogation of the vehicle, and aggregate time of operation at that time and date from the touch memory button reader 108. This transfer occurs when the data transfer contact tip 110 of the touch memory button reader 108 physically touches the touch sensor located in the socket of the downloading station 112.

Each of the vehicles 10 is provided with a memory button 22 within a protected enclosure, but which is accessible for the electronic transfer of data by the physical connection provided by the extension circuit 98 and the socket 102. The unique vehicle identification code for each vehicle 10 is the serial number of the memory button 22 located therewithin.

This unique vehicle identification code is electronically stored in the memory button 22 and is correlated with the particular vehicle 10 in which it is installed by the computer 114.

The user downloads the data file from the touch memory button reader 108 to the central computer system 114 through the downloader station 112 using conventional Windows 3.1, Windows 95, or Windows NT downloader software. The data file is imported into MS Access 2.0 or MS Access 8.0 within the computer system 114.

From the information derived using the memory buttons 22 and the touch memory button reader 108, the computer system 114 can generate detailed reports that include the cost of operation of each vehicle per hour, its maintenance history, its model number, and its serial number. Vehicles 10 requiring preventative maintenance are then flagged for specific maintenance routines. The flagged data is then reviewed and work orders may be automatically generated and are made available to the maintenance foreman either from the single computer system 114 illustrated, or through a network to a computer maintenance office.

Based upon the reports generated by the central computer system 114, the maintenance foreman prints work orders and issues them to maintenance technicians. The maintenance technicians perform the maintenance work orders and write up the parts used and the hours spent on each work order. This work order information is entered back into the computer system 114 by the maintenance technician using a conventional touch screen on the shop floor. The database within the central computer system 114 is thereupon updated. Cost tracking reports, usage reports, and other reports are thereby generated as required.

The present invention provides a unique and extremely cost effective system for automatically keeping track of the hours of actual vehicle operation of each of a plurality of vehicles within a vehicle fleet. The system does not require any information to be manually copied or even keyed into the computer system 114. As a consequence, the system is free from errors that occur due to inattentive transcription, illegibility, and missing data.

Undoubtedly, numerous variations and modifications of the invention will become readily apparent to those familiar with vehicle fleet maintenance. For example, electrical contacts in the vehicle other than those actuated by turning the ignition key, engagement of the propulsion system, or engagement of the power steering may serve as data inputs to the memory button. Indeed, the signal lines 16 and 18 to the operation logging circuit 20 may be connected to any component in the vehicle electrical system which is actuated during the time that the vehicle is actuated, but which is otherwise deactuated. For example, in a propane or gas driven forklift or other vehicle, the signal lines 16 and 18 may be connected to the distributor, alternator, tachometer, or any other actuated component of the vehicle that is indicative of vehicle operation. Accordingly, the scope of the invention should not be construed as limited to the specific embodiments illustrated or the particular implementation of the method described.

I claim:

1. In combination:

a motorized vehicle having a vehicle operating direct current electrical system for actuating and deactuating vehicle operation, and a vehicle body that includes an outer shell that shields a protected enclosure therewithin, a memory button having an electronic contact surface and which is disposed within said protected enclosure and which is programmed with a unique vehicle identification number and which includes an actuatable and deactuatable timer and an electronic storage register for accumulating aggregate time of operation of said timer, voltage regulation circuitry connected between said vehicle operating electrical system and said memory button for stepping down voltage from said vehicle operating system to provide an electrical input to said memory button during vehicle operation, an extension circuit connected to said electronic contact surface of said memory button and including an extension contact secured relative to said outer shell and accessible for physical contact from outside said shell, a touch memory button reader having a data transfer contact, and which copies said vehicle identification number and said aggregate time of operation of said timer from said memory button when said data transfer contact of said touch memory button reader touches said extension contact of said extension circuit, and a central computer system programmed to store and manipulate vehicle maintenance data concerning said motorized vehicle and which includes a touch sensor that extracts said copied vehicle identification number and said aggregate time of operation from said touch memory button reader when said data transfer contact of said touch memory button reader physically touches said touch sensor.

2. A combination according to claim 1 further characterized in that said memory button is provided with a date and time register for receiving inputs from said timer and for electronically storing in said time register the current time and date, and further characterized in that said touch button reader copies the contents from said time register when said data transfer contact touches said extension contact, and said central computer system extracts said copied contents of said time register when said data transfer contact touches said touch sensor.

3. A combination according to claim 2 wherein said voltage regulation circuitry steps down voltage to said memory button to a level of about 5 volts.

4. A combination according to claim 3 further comprising isolation circuitry connected to said memory button, said extension circuit and said vehicle operating direct current electrical system for isolating said memory button from said vehicle operating direct current electrical system when said data transfer contact of said touch memory button reader touches said contact of said extension circuit.

5. A combination according to claim 3 wherein said vehicle operating direct current electrical system includes power steering actuating contacts across which an electrical voltage differential exists when said vehicle is being operated, and said voltage regulation circuitry is connected between said power steering actuating contacts of said vehicle operating direct current electrical system and said memory button.

6. A combination according to claim 3 wherein said vehicle operating direct current electrical system includes propulsion engaging contacts across which an electrical voltage differential exists when said vehicle is being propelled, and said voltage regulation circuitry is connected between said propulsion engaging contacts of said vehicle operating direct current electrical system and said memory button.

7. A combination according to claim 3 wherein said vehicle operating direct current electrical system includes vehicle electrical power actuating contacts across which an electrical voltage differential exists when said vehicle is being powered for operation, and said voltage regulation circuitry is connected between said vehicle electrical power actuating contacts of said vehicle operating direct current electrical system and said memory button.

8. Apparatus for automatically recording actual time of operation of a plurality of motorized vehicles each of which has a vehicle operating direct current electrical system for actuating and deactuating vehicle operation and a vehicle body that includes an outer shell that shields a protected enclosure therewithin comprising:

an automated vehicle operation logging circuit installed in each of said vehicles, each of said vehicle operation logging circuits including a memory button having an electronic contact surface disposed within said protected enclosure and wherein each memory button is programmed with a unique vehicle identification code and which includes an electronic timer and an electronic register for ascertaining current time and date and for accumulating aggregate vehicle operation time provided by said timer, a voltage regulating circuit connected from said vehicle operating direct current electrical system for actuating and deactuating vehicle operation to provide a stepped down direct current data signal to said memory button during vehicle operation, an extension contact secured relative to said vehicle shell and accessible from the exterior of said shell, and an electrical extension line connected between said extension contact and said electronic contact surface of said memory button, a touch memory button reader which has a data transfer contact and which is operative to interrogate each memory button to copy each vehicle identification number and the contents of each electronic register in association therewith when said data transfer contact is selectively placed into contact with each extension contact of each automated operation logging circuit, and a central computer for maintaining maintenance records for all of said plurality of motorized vehicles and having a touch sensor that automatically downloads said copied vehicle identification numbers and said copied contents of said electronic registers of all of said vehicles when said data transfer contact of said touch memory button reader is placed in contact with said touch sensor of said central computer.

9. Apparatus according to claim 8 wherein said voltage regulating circuit includes components for reducing voltage to said memory button from said vehicle operating direct current electrical system to about five volts.

10. Apparatus according to claim 8 wherein said voltage regulating circuit includes components for limiting current to said memory button to no more than about five milliamperes.

11. Apparatus according to claim 8 wherein said vehicle operating direct current electrical system includes power steering enabling contacts across which an electrical voltage differential exists when power steering in said vehicle is being operated, and said voltage regulation circuit is connected between said power steering enabling contacts of said vehicle operating direct current electrical system and said memory button.

12. Apparatus according to claim 10 wherein said vehicle operating direct current electrical system includes forward and reverse propulsion engaging contacts across which an electrical voltage differential exists when said vehicle is being operated, and said voltage regulation circuit is connected between said forward and reverse propulsion engaging contacts of said vehicle operating direct current electrical system and said memory button.

13. Apparatus according to claim 10 wherein said vehicle operating direct current electrical system includes vehicle electrical power contacts across which an electrical voltage differential exists when said vehicle is being powered for operation, and said voltage regulation circuit is connected between said vehicle electrical power contacts of said vehicle operating direct current electrical system and said memory button.

14. A method of recording the accumulated time of operation of a motorized vehicle having a vehicle operating direct current electrical system for actuating and deactuating vehicle operation, and a vehicle body that includes an outer shell that shields a protected enclosure therewithin comprising:

providing within said protected enclosure a memory button having an electronic contact surface, an actuatable and deactuatable timer and an electronic storage register for accumulating aggregate time of operation of said timer, providing a voltage regulation circuit to step down direct current voltage from said vehicle operating electrical system to said memory button, providing an extension circuit from said electronic contact surface of said memory button to an extension contact accessible for physical contact from outside said shell, electronically storing in said memory button a unique vehicle identification code, thereafter periodically touching said extension contact with a touch memory button reader to copy therein from said memory button said unique vehicle identification code and said aggregate time of operation of said timer in association therewith, and downloading from said touch memory button reader said copied identification code and aggregate time of operation into a touch sensor which is part of a central computer system programmed to store and manipulate vehicle maintenance data concerning said motorized vehicle through physical contact between said touch memory button reader and said touch sensor.

15. A method of recording according to claim 14 wherein said memory button is provided with a date and time register for receiving inputs from said timer and further comprising electronically storing in said memory button an accurate time and date so that said timer thereafter maintains the current time and date in said memory button, and further comprising copying said then current time and date from said memory button along with said unique vehicle identification code and said aggregate time of operation and downloading from said touch memory button reader the time and date so copied along with said unique vehicle identification code and said aggregate time of operation.

* * * * *